Feb. 3, 1942.  T. A. RICH  2,271,991
FREQUENCY AND POWER FACTOR MEASUREMENT
Filed July 13, 1940
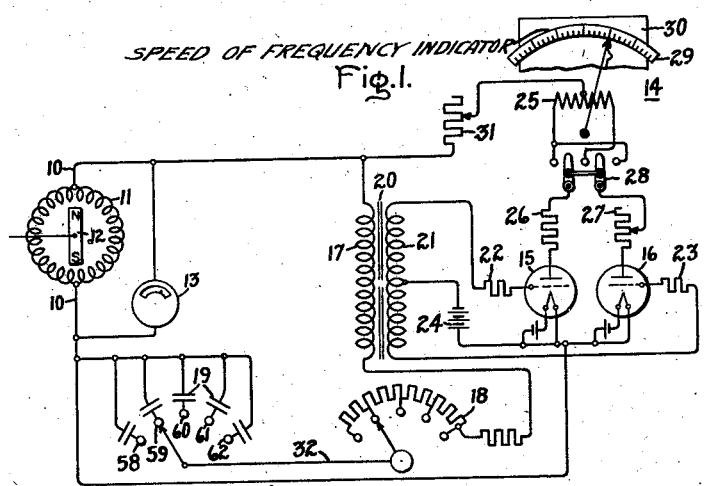
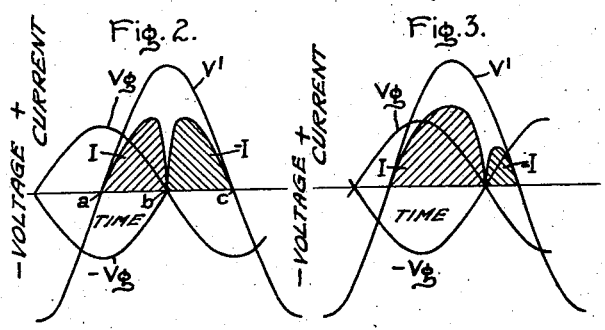
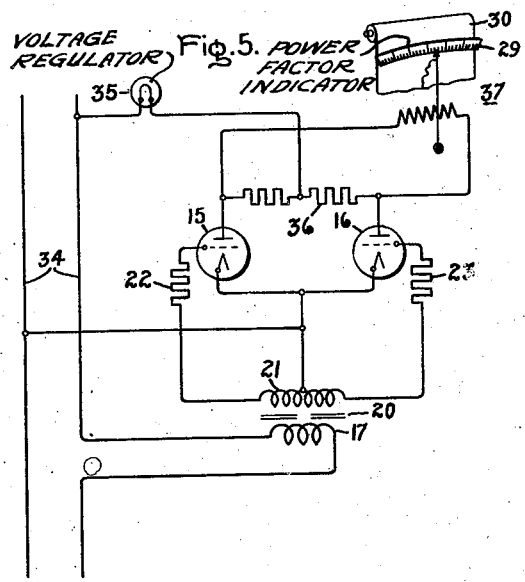
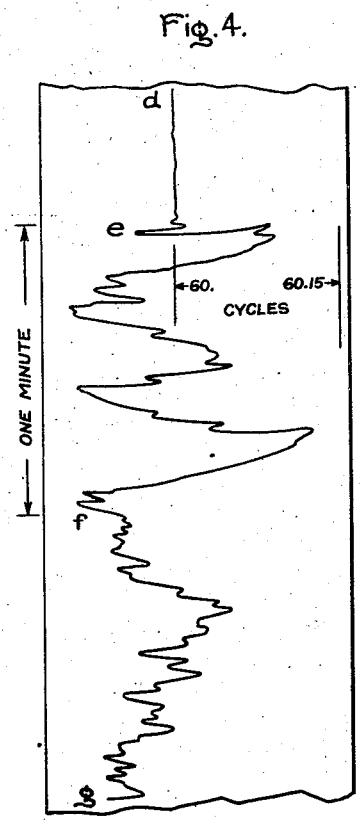
Inventor:
Theodore A. Rich,
by *Harry E. Dunham*
His Attorney.

Patented Feb. 3, 1942

2,271,991

UNITED STATES PATENT OFFICE 2,271,991

FREQUENCY AND POWER FACTOR MEASUREMENT

Theodore A. Rich, Schenectady, N. Y., assignor to General Electric Company, a corporation of New York Application July 13, 1940, Serial No. 345,398

5 Claims. (Cl. 172—245)

My invention relates to measuring apparatus which is highly sensitive to phase differences in an alternating current circuit or circuits. It may be employed for the measurement of speed or frequency and for the measurement of power factors.

The features of my invention which are believed to be novel and patentable will be pointed out in the claims appended hereto. For a better understanding of my invention, reference is made in the following description to the accompanying drawing in which Fig. 1 represents a circuit employing my invention for measuring speed; Figs. 2 and 3 show alternating voltage waves to be referred to in explaining my invention; Fig. 4 shows frequency variation records taken by the instrument of my invention; and Fig. 5 illustrates the circuit as used for the measurement of power factor in an alternating current circuit.

In Fig. 1, 10 represents an alternating current circuit, the frequency of which it is desired to measure. Where speed is to be measured, the circuit 10 may be supplied by a small A. C. generator having a stator winding 11 and a permanent magnet rotor 12, driven at the speed to be measured. In such case the voltage and frequency of circuit 10 will be proportional to the speed and a rough measurement thereof may be had by a voltmeter 13 calibrated in speed. For a more precise measurement, use is made of my invention. This consists of a measuring instrument 14 supplied from source 10 through vacuum twin triodes 15 and 16 placed in either the same or separate envelopes, which triodes are controlled by a phase shifting mutual inductance 17 supplied from the source 10 through a tuned circuit. The tuned circuit includes the primary 17 of the mutual inductance, a variable non-inductive resistance 18 and a variable condenser 19. The mutual inductance device has an iron core 20 containing an air gap. There is no appreciable load on the secondary and the secondary voltage is substantially in quadrature with the primary current. The secondary winding 21 has a mid-tap connected to the filaments of the tubes 15 and 16 and the opposite ends of the winding 21 are connected to the grids of the tubes through current limiting resistances 22 and 23. If desired, the two tubes may be replaced by a single tube with twin electrodes. 24 represents a grid bias battery to be used when needed.

The direct current measuring instrument 14 is of the zero center scale type and has a double circuit formed by a single coil 25 having a center tap connected to one side of source 10. The coil ends are connected to the plates of the two tubes through resistances 26 and 27 and a reversing switch 28. One of the resistances, i. e. 27 is made adjustable. By means of the reversing switch and the variable resistance 27, the tube circuits may be exactly balanced to compensate for tubes which are not exactly matched. The instrument 14 has an indicating scale 29 with which the pointer cooperates and preferably also a recording chart 30 on which the position of the pointer is recorded.

Where the apparatus is to be used for measurement of only one small frequency range, such as from 59½ to 60½ cycles, it would be unnecessary to provide for adjustment of the tuned circuit. However, an important feature of the apparatus is the ease by which it may be adjusted for a wide variety of such frequency measuring ranges and for this reason I have shown means for adjusting the value of the capacity and the non-inductive resistance in the tuned circuit. For this purpose I may use a variable capacity of the decade variety, or as schematically represented in Fig. 1, a large number of adjustment steps, each marked with the frequency at which the tuned circuit resonates for the corresponding adjustment. For example, in Fig. 1 the condenser is adjusted to the point marked 59 and it may be assumed that the tuned circuit is in resonance for such adjustment when the frequency is 59 cycles. Likewise, the condenser may be marked in speed rather than in frequency units. The number of such resonant tuning steps may be very greatly increased over the number represented and it may be assumed that only a small part of the capacitance adjustment range is here represented.

At the point of resonance, the current through the resonant circuit is in phase with the applied voltage of circuit 10. The voltage of secondary winding 21 is 90 degrees out of phase with the current in the tuned circuit, and of course at resonance is also 90 degrees out of phase with the voltage of circuit 10. This condition is represented in Fig. 2 where VI represents the voltage wave of circuit 10, Vg and —Vg represent the voltages applied to the grids of tubes 15 and 16. These latter voltages are 180 degrees out of phase because the grids are connected to the opposite ends of secondary winding 21, while the filaments are connected to the mid-tap of winding 21. VI also represents the voltage between filament and plate of both tubes since these tubes are in effect connected across line 10. Under these conditions, tube 15 will pass current when its grid and plate are positive, i. e. between points $a$ and $b$, Fig. 2, and this current may be represented by the shaded area I. Tube 16 will pass current when its grid and plate are positive, i. e., between points $b$ and $c$, Fig. 2, and this current may be represented by the shaded area —I. If these currents are equal, the instrument 29 will read zero at the center of its scale. If it does not read zero under this condition of resonance, the resistance 27 is adjusted until a zero reading is obtained and the reversing switch 28 is helpful in such adjustment for reversing the circuits through the instrument coils to detect any slight unbalance. With the condenser 19 adjusted for resonance at 59 cycles, the zero center reading of instrument 14 corresponds to 59 cycles. If, now, the frequency changes very slightly, the tuned circuit is no longer in resonance, but the current therein will lead or lag the voltage V1 by an amount corresponding to the change in frequency and the sharpness of tuning. The voltage waves $Vg$ and $-Vg$ will then shift with respect to wave V1, as represented, in Fig. 3. The direction of such shift will depend upon the direction of frequency change. Assume Fig. 3 represents an increase in frequency, the currents I and —I become unbalanced in one direction. If the frequency had decreased, the unbalance would have been in the opposite direction. In either case the instrument 14 deflects from zero and the switch 28 is thrown, if necessary, to cause an up-scale deflection for an increase in frequency. The sensitivity of instrument 14 may easily be made such that a very small percentage change in frequency of circuit 10 will produce a full scale deflection of the instrument. Change in sensitivity can readily be had by an adjustable resistance 31 in the instrument circuit or by the non-inductive resistance 18.

Fig. 4 shows an actual record of frequency variation taken by means of this invention on the New York Power and Light Company's 60 cycle commercial power system at Schenectady, N. Y., showing the normal frequency fluctuations of this well-regulated system. The record from $e$ to $f$ is the normal record where the width of the chart corresponds to a variation from 59.9 cycles to 60.15 cycles with a chart speed such that the distance from $e$ to $f$ along the chart represents one minute of time. At point $f$ the sensitivity of the instrument was considerably reduced by inserting resistance at 31, and the record from $f$ to $g$ shows the frequency record at this reduced sensitivity. The record from $d$ to $e$ is that produced by the recorder with the tuned circuit cut off but otherwise energized as in Fig. 1. The minor variations shown in this part of the record are probably due to fluctuations in voltage and wave form.

It will be evident that changes in resonance are not produced by changes in voltage and hence changes in voltage cannot cause any error at resonant frequency. In any case where voltage variations are considerable and it is desired to eliminate voltage errors which occur to some extent as the instrument deflects from zero, means for holding the voltage constant may be inserted in the circuit as shown in Fig. 5.

To the extent that the resistance in the tuned circuit changes with temperature, there will be a temperature error, but by proper design it can be made small.

It will be noted that in the circuit shown in Fig. 1, part of the resistance 18 is made adjustable with the condenser adjustment by reason of the conductor shaft connection represented at 32. This is a refinement that may be used for the purpose of maintaining a constant loss in the resonance circuit for the different resonant adjustments. For example, the loss in the mutual inductance core increases with frequency. If, then, the loss in the resistance 18 is decreased when tuning for higher frequencies by an amount sufficient to keep the total loss constant, the instrument scale can be calibrated in per cent change in frequency. If this refinement is not required, the resistance 18 need not be adjustable.

In Fig. 5 I have shown my invention connected to measure the power factor of a single phase circuit 34. The mutual inductance and tube circuit connections are the same as in Fig. 1. The primary 17 of the mutual inductance is here energized by or in proportion to the current of line 34. The tubes are connected across the line 34 and a ballast lamp 35 is used in this circuit to hold the voltage across the tubes constant. A resistance 36 with a mid-tap with a sensitive D. C. instrument 37 connected across the ends of the coil takes the place of the instrument 14 in Fig. 1. The instrument 37 will have a zero center scale marked for unity power factor, since at unity power factor the currents in both halves of resistance 36 will be equal and the voltage across instrument 37 will be zero. When the power factor is leading, the instrument will deflect in one direction, and when lagging, it will deflect in the opposite direction. Of course, if the power factor is always lagging, for instance, an instrument with its zero at one end of the scale may be used and this point marked for unity power factor and for lagging power factors the instrument will be connected to move the pointer up scale.

The deflection of the instrument 37 is independent of the value of current flow in the primary 17 of the mutual inductance over wide ranges of currents. In Fig. 5 the normal voltage applied across the device 35 and tube circuit may be of the order of 250 volts, and half of such voltage may be consumed in device 35. The resistances 22 and 23 may be of the order of 2 megohms each and the voltage across each half of secondary coil 21 may be of the order of 300 volts under normal conditions. These values are not given for the purpose of limiting the invention but to give values which are practicable to use in power house installations. The two vacuum tubes can be driven to cut-off for a few volts grid voltage and the non-conducting period of the tube will not be appreciably changed as long as the grid voltage is several times the cut-off value. The essential difference between Figs. 1 and 5 is in the use of the apparatus and even here there is very little difference because in Fig. 1 I actually measure the proper factor of the tuned circuit which changes with frequency.

What I claim as new and desire to secure by Letters Patent of the United States is:

1. Frequency measuring apparatus comprising a tuned circuit energized by the alternating current circuit the frequency of which is to be measured, the power factor of said single tuned circuit changing with the frequency and apparatus for measuring the power factor of said tuned circuit, including an instrument calibrated in terms of frequency.

2. Frequency measuring apparatus comprising a tuned circuit energized by the alternating current circuit the frequency of which is to be measured, apparatus responsive to the power factor of said tuned circuit comprising twin triodes having filament, grid and plate electrodes and having their output circuits connected to be energized in parallel by an alternating voltage in phase with that impressed upon said tuned circuit, means energized by the current of said tuned circuit for producing an alternating voltage in quadrature relation to such current, connections for impressing the last mentioned voltage between the filaments and grids of said triodes but in phase opposition and a direct current instrument calibrated in frequency for measuring the difference of the current flow through said triodes.

3. Apparatus for measuring frequency variations of an alternating current circuit comprising a circuit tuned to resonance at a frequency within the frequency variation range to be measured, twin triodes having filament, grid and plate electrodes having their output circuits connected in parallel across said tuned circuit, a mutual inductance having a primary winding in series with said tuned circuit and a secondary winding connected to bias the grids of said triodes in phase opposition, and a measuring instrument calibrated in frequency connected to measure the difference in the current flow in said triodes, said triode circuits being adjusted to produce similar current flow through both when the tuned circuit is in resonance.

4. Apparatus for measuring frequency variations of an alternating current circuit comprising a circuit tuned to resonance at a frequency within the frequency variation range to be measured, twin triodes having filament, grid and plate electrodes having their output circuits connected in parallel across said tuned circuit, a mutual inductance having a primary winding in series with said tuned circuit and a secondary winding connected to bias the grids of said triodes in phase opposition and a measuring instrument calibrated in frequency connected to measure the difference in the current flow in said triodes, said triode circuits being adjusted to produce similar current flow through both when the tuned circuit is in resonance, and means for varying the tuning of said tuned circuit to adapt the apparatus for measuring frequency variations over different frequency variation ranges.

5. Apparatus as claimed in claim 4 in which the means for varying the tuning of the tuned circuit includes variable capacity and variable resistance having their adjusting means arranged to be operated in such relation as to maintain the losses in the resonant circuit constant when the circuit is tuned for different frequencies.

THEODORE A. RICH.